Sept. 2, 1958  M. BERLIN ET AL  2,850,096
RULE DIE SET AND METHOD OF MAKING SAME
Filed March 4, 1957  2 Sheets—Sheet 1

INVENTORS.
MILTON BERLIN.
LAWRENCE M. RHEINGOLD.
BY
Percy Freeman
ATTORNEY.

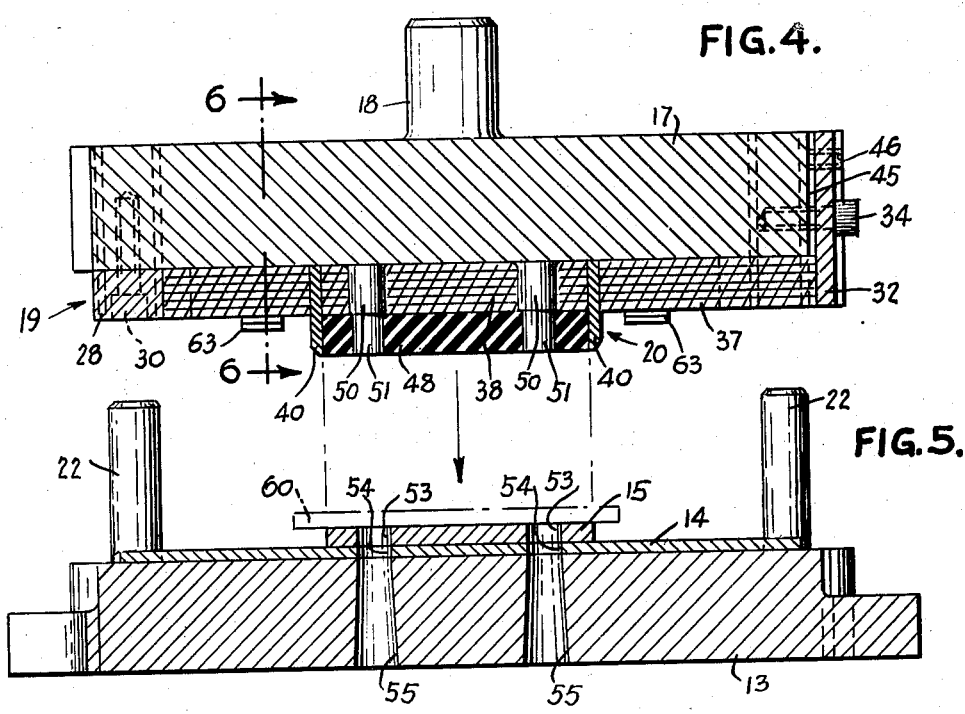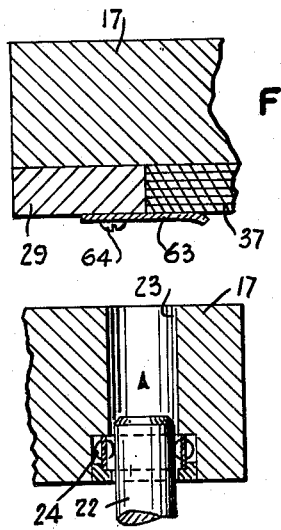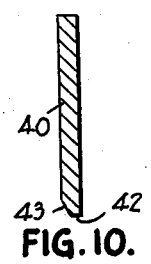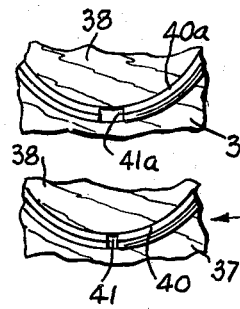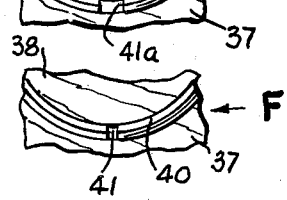

United States Patent Office 2,850,096
Patented Sept. 2, 1958

2,850,096
RULE DIE SET AND METHOD OF MAKING SAME

Milton Berlin, Forest Hills, and Lawrence M. Rheingold, Baldwin, N. Y., assignors to Templet Industries, Incorporated, Brooklyn, N. Y., a corporation of New York Application March 4, 1957, Serial No. 643,595

11 Claims. (Cl. 164—118)

This invention relates to die sets and, more particularly, to a die set having a substantially rigid male die, i. e. punch, member and a female die member constructed of a pair of complementary compressible blocks rigidly supporting a flexible metal edge therebetween, the edge and male die members cooperating to shear, i. e. blank out, sheet material.

This application is a continuation-in-part of our copending application, Serial Number 590,487, filed June 11, 1956, now abandoned, and has as one of its objects the provision of suitable adjustment means for simultaneously adjusting the compressive forces of the female die member blocks and for controlling the position of the female die member blade relative to the male die member.

It has been found that the die blades of the female die member must be sufficiently rigidified between the complemental die blocks in order to effect the shearing of sheet material in cooperation with the rigid male member. As a result, adjustment means have been provided for adjusting the compression of the die blocks between predetermined limits to obtain this desired rigidity. However, the adjustment of the compression of the die blocks also effects the relative position of the female member with respect to the relatively stationary male member, whereupon the proper meshing of the female and male die members becomes dependent upon the relative positions of the die blocks and blade. Failure of this type of die set to cut hard metal and, particularly, thicker metal often resulted because the rules or blades would collapse under heavy loads and after being used a relatively few number of times. Consequently, it has been found that sufficiently rigidified blades may be used for substantially thick metal sheet and for relatively long runs without requiring any maintenance.

Therefore, another object of the present invention is to provide a die set of the above type wherein the male die member is secured to a rigid base and the female die member is mounted for reciprocating translatory movement between a mating and a disengaged position with the male die member, wherein the female die member includes a plurality of compressible die blocks and a depending blade that is simple in construction, efficient in operation, and in which suitable adjustments are provided to assure the proper rigidity of the blade and the proper location of the female die member with respect to the male die member.

A still further object of the present invention is to provide a female die member having a bolster and chase for supporting a plurality of compressible die blocks and depending blade for movement between engaged and disengaged positions with the male die member, in which the chase is provided with means for simultaneously adjusting the compression of the die blocks and the location of the blade with respect to the location of the male die member, the die blocks forming a blade-holding unit which is externally compressed to place the entire unit under compression.

Another object of the present invention is to provide a female die member having bracket means for preventing the disassembly of the respective compression die blocks and blades from the chase upon the removal of the compressive forces normally maintaining the parts in assembled position.

All of the foregoing and still further objects and advantages of this invention will become apparent from a study of the following specification, taken in connection with the accompanying drawing, wherein:

Fig. 4 is an enlarged longitudinal cross-sectional view taken along line 4—4 of Fig. 2.

Fig. 5 is a view similar to Fig. 4, taken along line 5—5 of Fig. 3.

Fig. 6 is a cross-sectional view taken along line 6—6 of Fig. 4.

Fig. 7 is an enlarged cross-sectional view taken along line 7—7 of Fig. 1.

Fig. 8 is an enlarged fragmentary view showing the assembly of the compression die blocks and blade prior to the compression thereof.

Fig. 9 is a view similar to Fig. 8, showing the relationship of the parts in response to the compression thereof.

Fig. 10 is an enlarged transverse cross-sectional view showing the configuration of the die blade.

Figure 1:
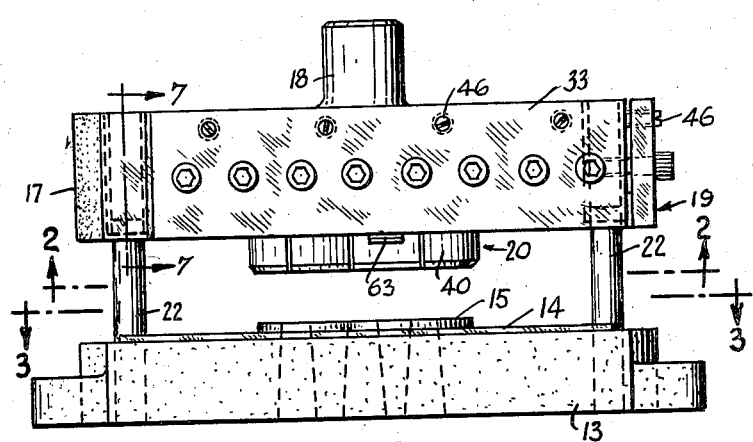
Fig. 1 is a front elevational view of a die set made in accordance with the present invention.

Referring now to Fig. 1 of the drawing, a die set made in accordance with the present invention is shown to include a substantially rigid base 13 having a platen 14 supported upon its upper surface. A punch or male die member 15 is rigidly secured to the top surface of the platen 14 by means of machine screws 16. A bolster 17 is supported for substantially vertical reciprocating movement relative to the base 13 by means of a ram 18 that is connected to the machine press (not shown). The bolster 17 supports a chase 19 in a manner hereinafter described, which chase adjustably supports the female die member 20. In order to assure the proper mating of the male and female die holders, a pair of upwardly extending guide pins 22 are secured to the base 13 and are slidably received within aligned bores 23 in the bolster 17. For ease of operation and accuracy, a ball bearing assembly 24 may be disposed within each bore 23 so as to provide an accurate and substantially frictionless guide for the pins 22.

Figure 2:
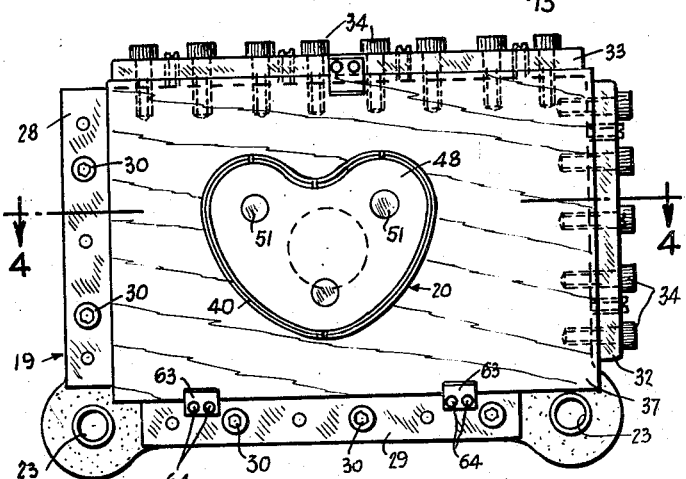
Fig. 2 is a bottom plan view taken along line 2—2 of Fig. 1, showing the female die member.
Figure 3:
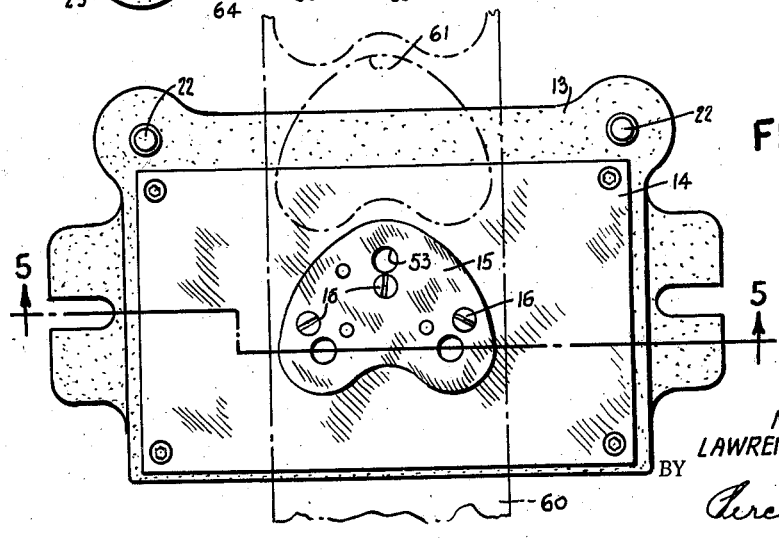
Fig. 3 is a top plan view taken along line 3—3 of Fig. 1, showing the male die member.

As is more clearly shown in Fig. 2 of the drawing, the chase 19 is preferably of rectangular configuration and includes a pair of adjacent perpendicularly related fixed walls 28, 29, which are integrally connected to the bolster 17 by means of machine screws 30. The other pair of perpendicularly related walls 32, 33 are adjustably supported upon the bolster 17 by means of bolts 34, whereupon they may be selectively displaced with respect to the opposite fixed walls. The purpose of providing the fixed and adjustable walls is to provide an adjustment for the compression of the female die members in a manner hereinafter described. For that purpose, it is only necessary to provide adjustment along any pair of perpendicularly intersecting lines so that substantially any force component may be obtained. Therefore, similar adjustments may be made by providing only one fixed wall and three adjustable walls, all adjustable walls, or a pair of diagonally opposite corners, one of which is adjustable and the other of which may be or may not be adjustable, The space between the respective fixed and adjustable walls is filled by a pair of complementary die blocks 37, 38, that are maintained in spaced relationship with each other by an edge formed by a plurality of blades 40. The die blocks are preferably constructed of wood or similar material that is more or less elastically compressible in the plane of the female die member. The lie blocks are so formed that the blades 40 will conform substantially to the form of the male die member 15 which is the exact configuration of the part to be stamped.

As is more clearly shown in Figs. 8 to 10, the blades 40 are of substantially flat configuration having a flat bottom edge 42 and a bevel 43. The bevel edge 43 is spaced from engagement with the male die member 15, so that the metal plate is sheared between the straight edge of the blade and the straight peripheral edge of the male die member. By tightening the bolts 34, the adjustable walls 32, 33 may be urged into compressing engagement with the die block 37, thereby urging the blade sections 40 into engagement with the center die block 38. Sufficient space is provided between the respective blade sections 40, as shown in Fig. 8, so that upon the compression of the respective parts, these spaces are substantially reduced, as shown in Fig. 9, so as to provide a substantially continuous shear edge. Since the male die member 15 is relatively fixed, the adjustment of the side walls 32, 33, not only compresses the die blocks and blade, but also effects the displacement of the entire female die member within the plane of the chase. Therefore, the adjustment of the bolts 34 must be so made as to maintain the male and female die members in axial alignment with each other in both the longitudinal and transverse directions so that the female die member is properly orientated with the male die member, as well as assuring sufficient compression of the parts. In other words, prior to applying compression to the die blocks, the closed shape defined by the blade nearly exactly properly matches the shape of the male die member and is in nearly exact proper alignment therewith. However, after the die blocks are compressed to a degree sufficient at least to rigidify the blade, the compression is adjusted to vary the shape of the blade so that it will properly match the shape of the male die member and likewise to perfect the alignment of the blade so that it will be in proper alignment with the male die member. In order to permit sufficient room for full compression of the blocks, the outer block 37 is made substantially larger than the corresponding lateral and longitudinal dimensions of the bolster 17, as more clearly shown in Fig. 4. Therefore, the tightening of the adjustment bolts 34 does not lock the associated wall to the bolster until the die block is compressed to a point beyond the peripheral edge of the bolster. However, during the tightening of the bolster 34, there is a tendency for the adjustable wall to rotate about its central longitudinal axis so that the upper edge thereof is urged towards engagement with the bolster, while the lower edge thereof is prevented from moving inwardly by the block 37. Accordingly, a plurality of set screws 46, disposed intermediate the upper edge of th adjustment walls and the bolts 34, provide means for controlling the angular relationship of the plane of the wall with the line of movement of the female die member. As such, tightening of the set screws 46 against the side 45 of the bolster is effective to maintain the adjustable walls in a vertical relationship.

The aforementioned adjustable side walls also permit the die set to be removed from the press, temporarily stored, and then later assembled for use. Any misalignment or warping of the female die set that might occur during the interval may be taken care of by adjustment of each of the bolts 34, whereby the original contour of the blades may be restored with respect to the rigid male die member. Following this, the die members can be aligned or orientated in the foregoing manner.

The space defined by the blades 40 is preferably filled with a resilient stripper pad 48 which automatically effects the disengagement of the stamped elements. As is shown in Fig. 4, male punches 51 having enlarged bases 50 received within corresponding bores in the inner compression die block 38, may be provided to punch holes in the stampings. These punches are placed in alignment with corresponding openings 53 in the male die member 15, whereby the holes are automatically punched into the metal strip 60 during the stamping of the parts. Similar holes 54, 55 are provided in the platen 14 of the base 13, respectively, to provide means for removing the punched out material.

As is more clearly shown in Figs. 2 and 4, a plurality of brackets or support arms 63 are secured to the fixed and adjustable walls, such as by screws 64, and are arranged to underlie the die block 37. Thus, upon loosening the adjustment bolts 34, the female die parts are maintained in proper position and cannot drop by gravity out of the chase. This arrangement facilitates the adjustment of the female die member so that accuracy in location and compression adjustments may be had.

After the female die parts have been properly oriented with respect to the male die member, and the parts placed under the proper amount of compression, a metal strip 60 may be fed between the members, whereupon the metal stampings may be made in a conventional manner.

While this invention has been described with particular reference to the construction shown in the drawing, it is to be understood that such is not to be construed as imparting limitations upon the invention, which is best defined by the claims appended hereto.

Having thus described our invention, what we claim as new and desire to secure by Letters Patent is:

1. In a die set for blanking out a shape from sheet metal: a shaped male punch member, a female die member, means mounting said male punch member and said female die member in mutual alignment and for relative reciprocatable translatory movement toward and away from one another from spaced into operative engagement, said female die member constituting at least two compressible die blocks forming a blade-holding unit, said blocks having complemental edge surfaces, at least one die blade defining a closed shape located between said complemental surfaces and having a longitudinal edge portion protruding beyond said die blocks and toward and in nearly exact proper alignment for shearing with the male punch member, said die blade having a shape nearly properly matching for shearing that of the male punch member, a rigid backing member against which said die blocks and blade are abutted, and means carried by the said rigid member and pressing inwardly against the outer sides of the blade-holding unit and placing said entire unit under compression thereby to compress said die blocks against opposite sides of the die blade so as to rigidify the die blade, properly align for shearing the die blade with the male punch member and properly match for shearing the shape of the die blade to the shape of the male punch member.

2. In a die set for blanking out a shape from sheet metal: a shaped male punch member, a female die member, means mounting said male punch member and said female die member in mutual alignment and for relative reciprocatable translatory movement toward and away from one another from spaced into operative engagement, said female die member constituting at least two compressible die blocks forming a blade-holding unit, said blocks having complemental edge surfaces, at least one die blade defining a closed shape located between said complemental surfaces and having a longitudinal edge portion protruding beyond said die blocks and toward and in nearly exact proper alignment for shearing with the male punch member, said die blade having a shape nearly properly matching for shearing that of the male punch member a rigid backing member against which said die blocks and blade are abutted, and means carried by the said rigid member and pressing inwardly against the outer sides of the blade-holding unit and placing said entire unit under compression thereby to compress said die blocks against opposite sides of the die blade so as to rigidify the die blade, properly align for shearing the die blade with the male punch member and properly match for shearing the shape of the die blade to the shape of the male punch member, said last named means including at least a first member fixed with respect to the rigid member and a second member movable with respect to the rigid member and shiftable toward and away from the first member.

3. A combination as set forth in claim 2 wherein the the second member is adjustably rotatable about an axis perpendicular to the direction of relative movement of the male punch member and female die member and also perpendicular to the direction of movement of said second member with respect to the rigid member and toward and away from the first member.

4. In a die set for blanking out a shape from sheet metal: a shaped male punch member, a female die member, means mounting said male punch member and said female die member in mutual alignment and for relative reciprocatable translatory movement toward and away from one another from spaced into operative engagement, said female die member constituting at least two compressible die blocks forming a blade-holding unit, said blocks having complemental edge surfaces, at least one die blade defining a closed shape located between said complemental surfaces and having a longitudinal edge portion protruding beyond said die blocks and toward and in nearly exact proper alignment for shearing with male punch member, said die blade having a shape nearly properly matching for shearing that of the male punch member a rigid backing member against which said die blocks and blade are abutted, and means carried by the said rigid member and pressing inwardly against the outer sides of the blade-holding unit and placing said entire unit under compression thereby to compress said die blocks against opposite sides of the die blade so as to rigidify the die blade, properly align for shearing the die blade with the male punch member and properly match for shearing the shape of the die blade to the shape of the male punch member, said last named means comprising at least a first elongated member fixed with respect to the rigid member, a second elongated member fixed with respect to the rigid member, and a third and a fourth elongated member movable with respect to the rigid member, said first and second members being perpendicular to one another, said third member being parallel to said first member, said fourth member being parallel to said second member, and said third and fourth members being movable perpendicular to their respective lengths.

5. In a die set for blanking out a shape from sheet metal: a shaped male punch member, a female die member, means mounting said male punch member and said female die member in mutual alignment and for relative reciprocatable translatory movement toward and away from one another from spaced into operative engagement, said female die member constituting at least two planar compressible die blocks forming a blade-holding unit, said blocks having complemental edge surfaces, the blocks being in a common plane, at least one die blade defining a closed shape located between said complemental surfaces and having a longitudinal edge portion protruding beyond said die blocks and toward and in nearly exact proper alignment for shearing with the male punch member, said die blade having a shape nearly properly matching for shearing that of the male punch member a rigid backing member against which said die blocks and blade are abutted, and means carried by the said rigid member and pressing inwardly against the outer sides of the blade-holding unit and placing said entire unit under compression thereby to compress said die blocks in their common plane against opposite sides of the die blade so as to rigidify the die blade, properly align for shearing the die blade with the male punch member and properly match for shearing the shape of the die blade to the shape of the male punch member.

6. In a die set for blanking out a shape from sheet metal: a shaped male punch member, a female die member, means mounting said male punch member and said female die member in mutual alignment and for relative reciprocatable translatory movement toward and away from one another from spaced into operative engagement, said female die member constituting an outer compressible die block having an opening therein of predetermined contour, die blade means extending around and in contact with the edge of said opening and including a longitudinal edge portion protruding beyond said die block and toward and in nearly exact proper alignment for shearing with the male punch member and defining a closed shape nearly properly matching for shearing the shape of the male punch member, another die block located within said opening and bearing against the die blade means, said die blocks forming a die blade means holding unit a rigid backing member against which said die blocks and blade means are abutted, and means carried by the said rigid member and pressing inwardly against the outer sides of the outer compressible die block and placing the entire die blade means holding unit under compression thereby to compress said die blocks against opposite sides of the die blade means so as to rigidify the die blade means, properly align for shearing the die blade means with the male punch member and properly match for shearing the shape of the die blade means to that of the male punch member.

7. In a die set for blanking out a shape from sheet metal: a shaped male punch member, a female die member, means mounting said male punch member and said female die member in mutual alignment and for relative reciprocatable translatory movement toward and away from one another from spaced into operative engagement, said female die member constituting an outer compressible die block having an opening therein of predetermined contour, die blade means extending around and in contact with the edge of said opening and including a longtudinal edge portion protruding beyond said die block and toward and in nearly exact proper alignment for shearing with the male punch member and defining a closed shape nearly properly matching for shearing the shape of the male punch member, another die block located within said opening and bearing against the die blade means, said die blocks forming a die blade means holding unit a rigid backing member against which said die blocks and blade means are abutted, and means carried by the said rigid member and pressing inwardly against the outer sides of the outer compressible die block and placing the entire die blade means holding unit under compression thereby to compress said die blocks against opposite sides of the die blade means so as to rigidify the die blade means, properly align for shearing the die blade means with the male punch member and properly match for shearing the shape of the die blade means to that of the male punch member, said die blade means including a plurality of die blades arranged in end-to-end relationship with their ends spaced from one another when said compressing means is ineffective and substantially in abutment when the compressing means is effective.

8. A die set as set forth in claim 6 wherein the outer die block is rectangular and wherein the compressing means constitutes a rectangular frame, at least two perpendicularly related sides of which are fixed with respect to the backing member and the remaining two sides of which are movable with respect to the backing member perpendicularly toward and away from the opposite sides of the frame.

9. A die set as set forth in claim 8 wherein the second named die block is compressible.

10. A die set as set forth in claim 9 wherein the die blocks are plane and wooden and lie in a common plane.

11. In a method of making a die set for blanking out a shape from sheet metal: that improvement including the steps of providing a shaped male punch member, providing a female die member including a die blade shaped to a closed contour nearly properly matching for shearing that of the male punch member, positioning the die blade between compressible die blocks with the longitudinal edge of the die blade protruding from the die blocks in nearly exact proper alignment for shearing with the male punch member, said die blocks constituting a blade-holding unit, backing up the die blocks and blade with a rigid backing member pressing inwardly against the outer sides of the blade-holding unit so as to place the entire unit under compression and thereby compress the die blocks against opposite sides of the die blade so as to rigidify the same, varying the degree of compression so as to properly align for shearing the die blade with the male punch member and properly match for shearing the shape of the die blade to the shape of the male punch member.

References Cited in the file of this patent

UNITED STATES PATENTS

| | | |
|---|---|---|
| 38,750 | Knickerbocker | June 2, 1863 |
| 128,159 | Merriam | June 18, 1872 |
| 163,674 | McKenzie | May 25, 1875 |
| 434,956 | Scofield | Aug. 26, 1890 |
| 990,426 | Dewes | Apr. 25, 1911 |
| 1,082,986 | Wilder | Dec. 30, 1913 |
| 1,701,545 | Shaw | Feb. 12, 1929 |
| 1,701,546 | Shaw | Feb. 12, 1929 |